United States Patent [19]

Mader

[11] Patent Number: 4,795,202
[45] Date of Patent: Jan. 3, 1989

[54] LIFTING HANDLE FOR PRESSURIZED GAS CONTAINERS

[76] Inventor: Stephen M. Mader, 1011 2nd St., Crawford, Nebr. 69339

[21] Appl. No.: 171,646

[22] Filed: Mar. 22, 1988

[51] Int. Cl.$^4$ .................. B65D 63/18; B65G 7/12
[52] U.S. Cl. .................. 294/16; 294/31.2; 294/114
[58] Field of Search .............. 294/15, 16, 28, 31.2, 294/106, 113, 114, 164, 165

[56] References Cited

U.S. PATENT DOCUMENTS

| 151,061 | 5/1974 | Stuart | 294/114 |
|---|---|---|---|
| 215,344 | 5/1879 | Flynn | 294/31.2 |
| 844,239 | 2/1907 | Bogel | 294/16 |
| 1,491,171 | 4/1924 | Salvail | 294/16 |
| 1,987,493 | 1/1935 | Richards | 294/16 |
| 4,463,978 | 8/1984 | Mountain et al. | 294/31.2 |

*Primary Examiner*—Johnny D. Cherry
*Attorney, Agent, or Firm*—Kimmel, Crowell & Weaver

[57] ABSTRACT

In accordance with the invention, a lifting handle (10) for lifting and carrying cylindrical, metal, pressurized gas containers (C) comprises a circular metal band (11) with a pair of diametrically opposite cut-outs (12,13) therein, and a pivot mount (14) secured to the band in spanning relationship to each cut-out. A right cylindrical wedging member (20) is pivotally supported on each pivot mount by a pin (22) carried by the pivot mount. The pin extends through a pivot bore (25) offset to one side of the axis of the cylindrical wedging member, whereby rotation of the wedging member about the pivot results in a swinging motion of the wedging member toward and away from the adjacent container. A hand grip or handle (21) is fixed to the wedging member for rotating it about the pivot pin, whereby the wedging member may be brought into and out of engagement with the container to lift and carry the container in a vertical, upright position. The pivot mount (14) has a generally inverted U-shaped configuration, with a pair of downturned legs (16,17) welded to the band on opposite sides of the respective cut-out, and a bridging member (15) integral with the legs and spanning the cut-outs in slightly spaced relationship above the band.

3 Claims, 2 Drawing Sheets

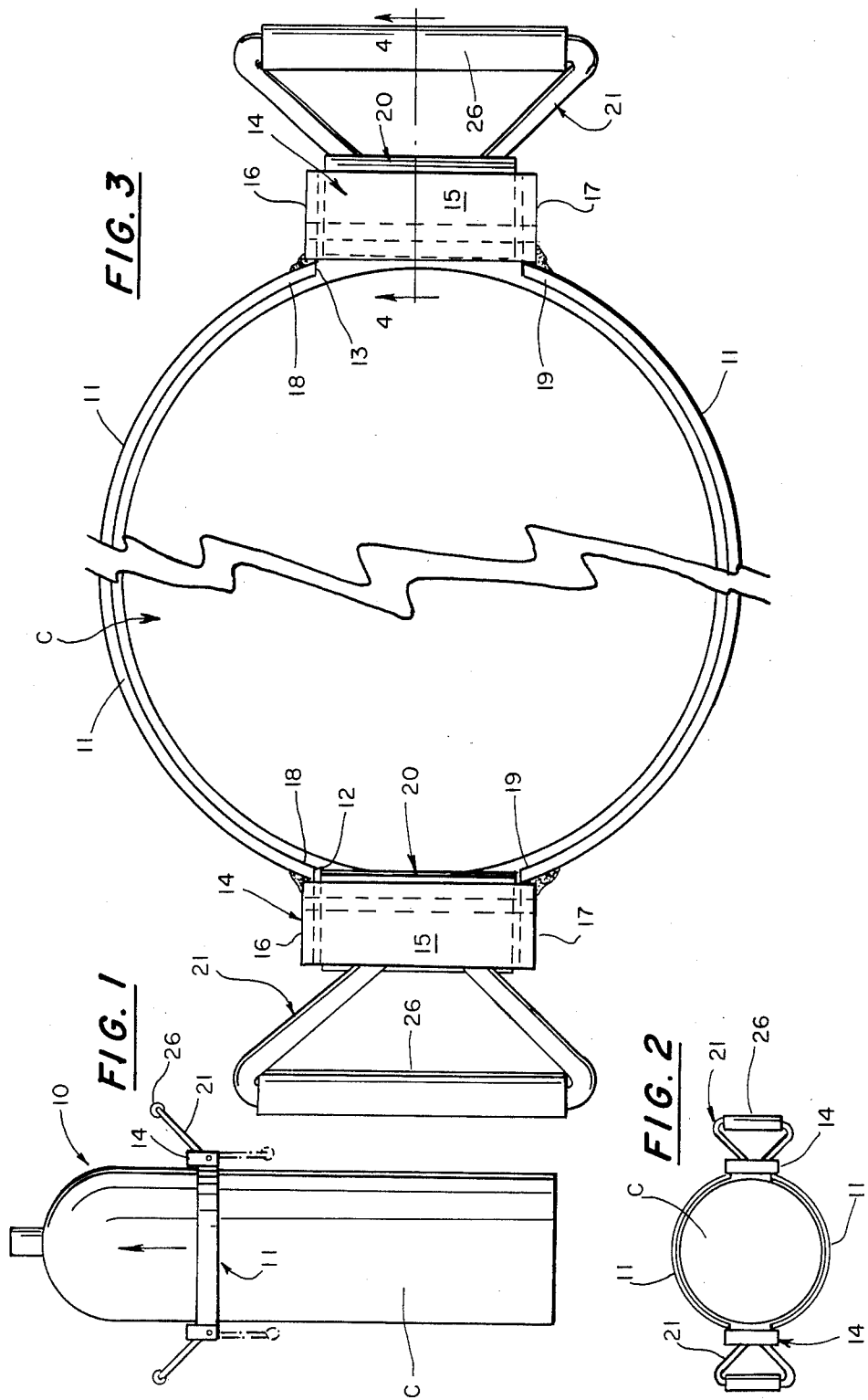

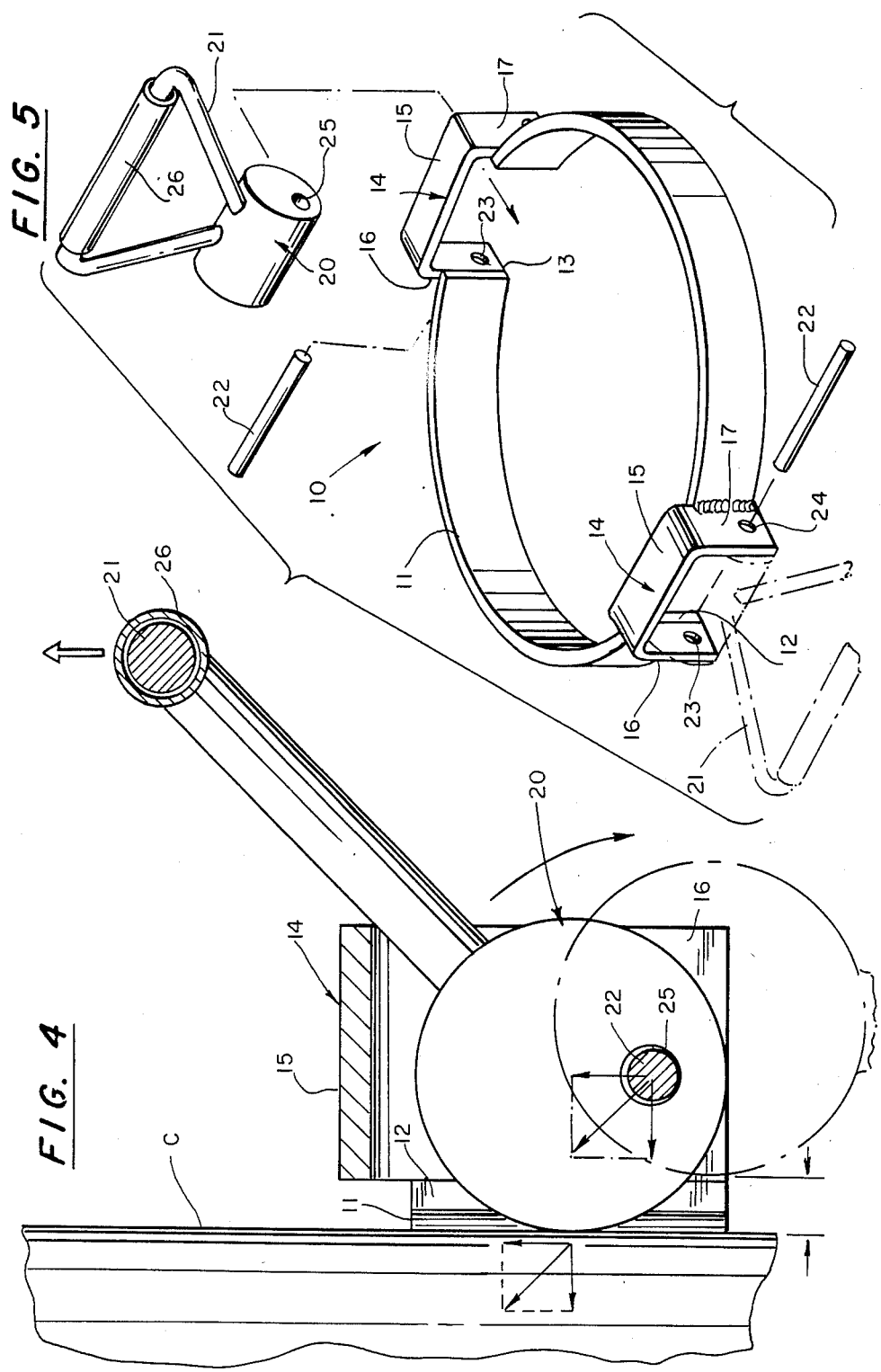

4,795,202

LIFTING HANDLE FOR PRESSURIZED GAS CONTAINERS

FIELD OF THE INVENTION

This invention relates to lifting handles for containers of pressurized gas, and more particularly, to a lifting handle which can be quickly and easily applied to and removed from bottles of pressurized gas to carry the bottles in an upright position.

PRIOR ART

Pressurized gasses such as oxygen, argon, nitrogen, helium, propane and the like are frequently placed under high pressure in elongate, cylindrical metal containers or bottles for shipment to and use at remote locations. These containers are regarded as dangerous, and it is required that the containers or bottles be transported, stored and used at all times in a vertical position. Moreover, it is also required that no one person should lift over 50 pounds when handling these dangerous gas containers.

Various removable handles or carrying devices are known in the prior art for lifting and carrying cylindrical containers or bottles. Two examples of prior art devices are shown in U.S. Pats. Nos. 215,344 and 4,463,978. U.S. Pat. No. 215,344 discloses a carrying handle for lifting and carrying wooden barrels. In this patent, a pair of bent handles "d" are pivotally received on opposite sides of a hoop "a", and the handles have sharp projections thereon which bite into the wood of the barrel when the handle is lifted. The handles in this patent act as levers, and rely upon the sharp projections biting into the wood for their gripping action. If this device were used on a metal container, the sharp projections would damage the container.

U.S. Pat. No. 4,463,978 discloses a handle for a diving tank, in which a clamping ring or band 12 encircles a diving tank and a cam 14 on one side of the ring is manipulated to exert a pulling force on the bank, clamping the tank in place between the ring and the cam. This handle supports the tank at an angle and not in an upright position.

SUMMARY OF THE INVENTION

Accordingly, it is an object of this invention to provide a lifting handle for containers of pressurized gas, in which the handle may be quickly and easily applied to and removed from the containers, and which securely grips the container without marring or damaging the container.

Another object of the invention is to provide a lifting handle for containers of pressurized gas, in which a handle is mounted on each of the opposite sides of a band placed about the container, whereby two persons may readily lift the container and the container is supported in an upright, vertical position.

In accordance with the invention, a circular metal band has an interrupted or cut-out portion on each of diametrically opposite sides thereof, and a generally inverted, U-shaped pivot mount is welded to the band at each of the cut-out portions, spanning the cut-outs and forming a continuous band. A right cylindrical wedging member is pivotally supported on the U-shaped pivot mount by a pin carried by the pivot mount, so that the axis of the wedging member extends tangentially to the band and spans the cut-out portion. The pin extends through a pivot bore formed longitudinally through the wedging member and offset to one side of the axis of the wedging member, whereby rotation of the wedging member about the pivot results in a swinging motion of the wedging member toward and away from the adjacent container. A handle is fixed to the wedging member for rotating it about the pivot pin, whereby the wedging member may be brought into and out of engagement with the container. The cylindrical configuration of the wedging member enables it to be easily manufactured, and in conjunction with the swinging motion imparted to it by the eccentrically positioned pivot pin, results in a secure wedge-like grip on the container without danger of marring or damaging the surface of the container. In addition, the provision of a handle on two diametrically opposite sides of the container enables either one or two persons to lift the container, and ensures that the container can be lifted by the handles and maintained in a vertical, upright position.

BRIEF DESCRIPTION OF THE DRAWINGS

These and other objects and advantages of the invention will become apparent from the following detailed description and claims when considered with the appended drawings, wherein like reference characters designate like parts throughout the several views, and wherein:

FIG. 1 is a side view in elevation of a pressurized gas container with the lifting handle of the invention attached thereto and in a position operative to lift the container;

FIG. 2 is a top plan view of the container and handle of FIG. 1, with the handles shown as extending diametrically outwardly from the band in a position between fully engaged and fully disengaged relationship of the wedging member with the container;

FIG. 3 is a greatly enlarged fragmentary plan view of the lifting handle of the invention, with the handle and wedging member on the right-hand side of the figure shown rotated to its upward, operative lifting position, and the handle and wedging member on the left-hand side of the figure shown rotated downwardly to its inoperative position;

FIG. 4 is an even further enlarged view in section, taken along line 4—4 in FIG. 3; and FIG. 5 is an exploded top perspective view of the lifting handle of the invention.

DETAILED DESCRIPTION OF THE PREFERRED EMBODIMENT

Referring more specifically to the drawings, the lifting handle of the invention is indicated generally at 10, and in FIGS. 1-4 is shown attached to a bottle or container "C" of pressurized gas. The container is typically made of a relatively heavy gauge metal for holding a quantity of gas under pressure, which, for example, may exceed several hundred pounds per square inch. Various gasses are placed in such containers, including argon, oxygen, helium, nitrogen, propane, etc. The nature of the gasses and the high pressure under which they are placed in such containers makes these containers of pressurized gasses dangerous, requiring special care in their handling. For example, OSHA requires that they always be maintained in a vertical, upright position, and that no one person handling the containers be required to lift more than 50 pounds. Further, nothing should be used in handling the containers that is likely to damage or weaken the container.

The lifting handle 10 comprises a circular metal band or ring 11 having cut-outs 12 and 13 on two diametrically opposite sides (see FIGS. 3 and 5). A generally U-shaped pivot mount 14 having a bridging member 15 with downturned legs 16 and 17 on opposite ends thereof is welded to the facing ends 18 and 19 of the band on opposite sides of the cut-outs 12 and 13. This bridging member makes the ring rigid and serves as a mount for the lifting handles. The inner side edges of the legs 16 and 17 are welded to the outer end surfaces of the ends of the band at the respective cut-outs, with the inner surfaces of the legs substantially flush with the ends of the band on opposite sides of the respective cut-out, and the bridge 15 spaced slightly above the top of the band in spanning relationship to the cut-out.

A wedging member 20 and hand grip or handle 21 are pivoted to each pivot mount 14 by pivot pin 22 extending through aligned openings 23 and 24 in the legs 16 and 17 and a pivot bore 25 formed longitudinally through the wedging member in offset relationship to the longitudinal axis of the wedging member. A roller or sleeve 26 is fitted over the hand grip 21 to facilitate use of the lifting handle of the invention.

As seen best in FIG. 4, the wedging member 20 has a right cylindrical configuration and is pivoted to the legs 16 and 17 so that the wedging member makes a swinging motion toward and away from the container "C" when the hand grip 21 is raised and lowered, respectively. Thus, when the lifting handle 10 is placed about a container "C" and the hand grips 21 lifted or raised to the position shown in full lines in FIGS. 1 and 4, the wedging members 20 at opposite sides of the container swing inwardly through the respective openings or cutouts 12 and 13 and come into wedging contact with the sides of the container, frictionally gripping the sides of the container whereby it may be lifted and carried in a vertical, upright position via the handle 10. Alternatively, when the hand grips 21 are permitted to drop to the position shown in dot-and-dash lines in FIGS. 1 and 4, the wedging members 20 swing upwardly and outwardly away from the container.

The invention is exceptionally simple and economical in construction, using readily available cylindrical stock for the wedging members rather than complex and expensive cam shapes, and results in a lifting handle which is secure and reliable in use and which does not mar or damage the surface of the containers being lifted.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A lifting handle for elongate, cylindrical, pressurized gas containers, comprising:
   a circular band or ring for placement about a container, said band having a pair of diametrically opposite cut-outs therein, defining spaced apart ends on the band with an opening therebetween;
   a generally inverted U-shaped pivot mount on the band at each cut-out, spanning the opening between said ends; and
   a pivoted wedging member carried by said pivot mount in a position to be swung into and out of engagement with an adjacent surface of the container to grip the container and enable it to be lifted and carried with the lifting handle, said wedging members each being shaped as a right cylinder and being supported for swinging movement by a pivot pin carried on the pivot mount and extending through a pivot bore formed longitudinaly through the wedging member in an offset position from the longitudinal axis of the wedging member.

2. A lifting handle as claimed in claim 1, wherein:
   a hand grip is connected to the wedging member to swing the wedging member into and out of contact with the adjacent surface of the container.

3. A lifting handle as claimed in claim 2, wherein:
   the U-shaped pivot mount comprises a bridging member having a pair of downturned legs on opposite ends thereof, said legs having an inner edge welded to an outer end surface portion of the band on opposite sides of the respective cut-out; and
   the wedging members extend through the openings or cut-outs and into contact with the adjacent surface of the container when the hand grip is manipulated to engage the wedging members with the container.

* * * * *